UNITED STATES PATENT OFFICE.

ALPHEUS MYERS, M. D., OF LOGANSPORT, INDIANA.

TAPE-WORM OPERATION.

Specification forming part of Letters Patent No. 11,943, dated November 14, 1854.

*To all whom it may concern:*

Be it known that I, ALPHEUS MYERS, M. D., of Logansport, in the county of Cass and State of Indiana, have invented a new and Improved Surgical Process for the Removal of Tape-Worms or other Worms from the Stomach and Intestines; and I do hereby declare that the following is a full, clear, and exact description of the same.

My invention consists in the removal of tape-worms from the stomach or intestines by causing a patient to swallow a bait in a trap of any suitable construction that will catch the worm when he seizes the bait, and enable him to be withdrawn from the patient's mouth by a string which is attached to the trap for the purpose before being swallowed.

The invention is not limited to the particular construction of the trap employed, as it is probable that there are many different ways in which a trap may be constructed for the purpose, though I have performed my invention successfully with a trap composed of an exterior and interior cylinder, the former being closed at its ends and containing within it the latter, which contains the bait, each having an opening of suitable size to admit the head of the worm on one side. When the trap is set preparatory to being swallowed the two holes are brought opposite to each other, so as to enable the worm to seize the bait in the interior cylinder, and are thus secured by a catch; but when the worm, in eating the bait, agitates the interior cylinder, it escapes from the catch and is caused by a spring to be moved, so as to catch him between one edge of the hole in the outer cylinder and the opposite edge of the hole in the interior cylinder and hold him till drawn out by the withdrawal of the trap.

The process of removal is conducted in the following manner: The patient is put upon a strict course of diet for several days, and in some cases from five to six and even seven days, without any nourishment whatever but water to allay thirst. After this the worm becomes very hungry and will draw himself into the stomach by an instinct which belongs to all species of worms, and which causes them, when not finding sufficient nourishment in the bowels, to ascend into the stomach, and even sometimes into the throat. After the fast the trap is baited with any nutritious food—as, for instance, cheese—and attached to a small cord or line. It is then swallowed, and thus introduced into the stomach. The cord is fastened to some conspicuous place about the patient, who is left to his ease from about six to twelve hours, and during this time the worm will have seized the bait and have been caught by the head or neck. The capture of the worm will either be felt by the patient or ascertained by the motion which will be visible in the cord. The patient should rest for a few hours after the capture, and then by a gentle pulling at the cord the trap and worm will with ease and perfect safety be withdrawn. This ends the process, after which a proper course of diet is necessary to recruit the patient.

If the worm be not ensnared with the first twelve hours after swallowing the bait the trap must be withdrawn and the bait again properly adjusted and introduced as before, and the process repeated from time to time until the capture is effected.

What I claim as my invention, and desire to secure by Letters Patent, is—

The process herein described of removing tape or other worms from the stomach or intestines by means of a trap which is baited and swallowed by the patient, and is caused to capture them by the seizure of the bait.

ALPHEUS MYERS, M. D.

Witnesses:
JOHN H. SOWERS,
JOHN J. SWALE.